(12) United States Patent
Yin et al.

(10) Patent No.: US 10,043,381 B2
(45) Date of Patent: *Aug. 7, 2018

(54) EMPLOYING AR ELEMENT ON PREVIEW SCREEN TO CONTROL LAMP OR CURTAIN

(71) Applicant: Sony Corporation, Tokyo (JP)

(72) Inventors: Zhangbin Yin, Beijing (CN); Yingying Qu, Beijing (CN)

(73) Assignees: SONY CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/805,285

(22) Filed: Nov. 7, 2017

(65) Prior Publication Data

US 2018/0089991 A1 Mar. 29, 2018

Related U.S. Application Data

(63) Continuation of application No. 15/409,648, filed on Jan. 19, 2017, now Pat. No. 9,842,493, which is a (Continued)

(30) Foreign Application Priority Data

Nov. 14, 2014 (CN) .......................... 2014 1 0646264

(51) Int. Cl.
*G08C 17/02* (2006.01)
*G06F 3/0484* (2013.01)
*H04M 1/725* (2006.01)

(52) U.S. Cl.
CPC ........... *G08C 17/02* (2013.01); *G06F 3/0484* (2013.01); *G08C 2201/30* (2013.01);
(Continued)

(58) Field of Classification Search
CPC ................ G08C 17/02; G08C 2201/30; G08C 2201/92; G08C 2201/93; G06F 3/0484;
(Continued)

(56) References Cited

U.S. PATENT DOCUMENTS 8,918,719 B2 12/2014 Hilbrink
9,582,992 B2 2/2017 Yin et al.
(Continued)

OTHER PUBLICATIONS

International Search Report and Written Opinion for corresponding International Application No. PCT/IB2015/057363 dated Dec. 11, 2015.
(Continued)

*Primary Examiner* — Ali Neyzari
(74) *Attorney, Agent, or Firm* — Renner, Otto, Boisselle & Sklar, LLP

(57) ABSTRACT

A control apparatus and method and an electronic device. The apparatus includes: a communicating unit configured to establish communication connection with a controlled object; an image acquiring unit configured to obtain a preview image containing the controlled object; and a controlling unit configured to receive a control instruction inputted according to the preview image, and control the controlled object according to the control instruction. Controlling the controlled object according to the preview image containing the controlled object may realize control of the controlled object in a simple and convenient manner, thereby improving user experiences.

20 Claims, 5 Drawing Sheets

Related U.S. Application Data continuation of application No. 14/710,121, filed on May 12, 2015, now Pat. No. 9,582,992.

(52) U.S. Cl.
CPC ..... *G08C 2201/92* (2013.01); *G08C 2201/93* (2013.01); *H04M 1/72533* (2013.01)

(58) Field of Classification Search
CPC ........... G06F 3/04886; H04M 1/72533; H04N 21/4821
USPC ....................................... 340/12.54; 715/740
See application file for complete search history.

(56) References Cited

U.S. PATENT DOCUMENTS

| | | | |
|---|---|---|---|
| 9,842,493 B2 * | 12/2017 | Yin | ................ G08C 17/02 |
| 2011/0047474 A1 | 2/2011 | Sung et al. | |
| 2012/0210268 A1 | 8/2012 | Hilbrink et al. | |

OTHER PUBLICATIONS

Tesla: "Tesla Model S—Owner's manual (Europe)", Oct. 31, 2013, retrieved from the Internet: URL:https://carmanuals2.com/get/tesla-model-2-2014-owner-s-manual-europe-36740.

\* cited by examiner

EMPLOYING AR ELEMENT ON PREVIEW SCREEN TO CONTROL LAMP OR CURTAIN

RELATED APPLICATION DATA

This application is a continuation of U.S. application Ser. No. 14/710,121 filed on May 12, 2015 (now U.S. Pat. No. 9.582.992) and is a continuation of U.S. application Ser. No. 15/409,648 filed on Jan. 19, 2017 (now U.S. Pat. No. 9.842.493).The contents of both are hereby incorporated by reference in their entirety.

TECHNICAL FIELD

The present disclosure relates to the field of communications, and in particular to a control apparatus and method and an electronic device.

BACKGROUND ART

Currently, as the development of communication technologies, electronic devices, such as smart mobile phones, and tablet computers, etc., are widely used; and besides the original functions, such as communication, and entertainment, etc., the functions and applications of the electronic device have expanded continuously. In recent years, technologies have appeared in which an electronic device, such as a smart mobile phone, etc., is used to control another electronic product or equipment. In such technologies, a specific application in a smart mobile phone is opened, so as to look up and select an electronic product or equipment needing to be controlled in a menu, and control the electronic product or equipment needing the control in the menu.

SUMMARY

Currently, a specific application needs to be opened in using such electronic device as a smart mobile phone, etc., to control another electronic product or equipment, and an electronic product or equipment needing to be controlled is looked up and selected in a menu. Then the electronic product or equipment may be controlled via the menu. Hence, the operational process is relatively tedious, and a user cannot directly sense a result produced by such an operation in the operational process.

Embodiments of the present disclosure provide a control apparatus and method and electronic device. Controlling the controlled object according to the preview image containing the controlled object may realize control of the controlled object in a simple and convenient manner, thereby improving user experiences.

According to a first aspect of embodiments of the present disclosure, there is provided a control apparatus, including: a communicating unit configured to establish communication connection with a controlled object; an image acquiring unit configured to obtain a preview image containing the controlled object; and a controlling unit configured to receive a control instruction inputted according to the preview image, and control the controlled object according to the control instruction.

As will be appreciated, throughout the description herein the term "unit" also may be referred to and/or used equivalently and interchangeably with the term "module."

According to a second aspect of embodiments of the present disclosure, there is provided an electronic device, including the apparatus as described according to the first aspect of the embodiments of the present disclosure.

According to a third aspect of embodiments of the present disclosure, there is provided a control method, including: establishing communication connection with a controlled object; obtaining a preview image containing the controlled object; and receiving a control instruction inputted according to the preview image, and controlling the controlled object according to the control instruction.

An advantage of the embodiments of the present disclosure exists in that controlling the controlled object according to the preview image containing the controlled object may realize control of the controlled object in a simple and convenient manner, thereby improving user experiences.

With reference to the following description and drawings, the particular embodiments of the present disclosure are disclosed in detail, and principles of the present disclosure and the manners of use are indicated. It should be understood that the scope of the embodiments of the present disclosure is not limited thereto. The embodiments of the present disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. To facilitate illustrating and describing some parts of the disclosure, corresponding portions of the drawings may be exaggerated in size, e.g., made larger in relation to other parts than in an exemplary device actually made according to the disclosure. Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

In the drawings.

DETAILED DESCRIPTION

The interchangeable terms "electronic apparatus" and "electronic device" include portable radio communication apparatus. The term "portable radio communication apparatus", which hereinafter may be referred to as a "mobile radio terminal", "portable electronic device", or "portable communication device", includes all apparatuses such as mobile telephones, smart mobile phones, pagers, communicators, electronic organizers, personal digital assistants (PDAs), smartphones, portable communication devices or the like.

In the present application, embodiments of the disclosure are described primarily in the context of a portable electronic device in the form of a mobile telephone (also referred to as "mobile phone"). However, it shall be appreciated that the disclosure is not limited to the context of a mobile telephone and may relate to any type of appropriate electronic device, examples of such an electronic device including a camera, a video camera, a tablet computer, a smart watch, a pair of smart glasses, a heat wearable device, a wearable device, fixed line telephone, a medium player, a gaming device, a PDA, and a computer, etc.

The preferred embodiments of the present disclosure are described as follows with reference to the drawings.

Embodiment 1

Figure 1:
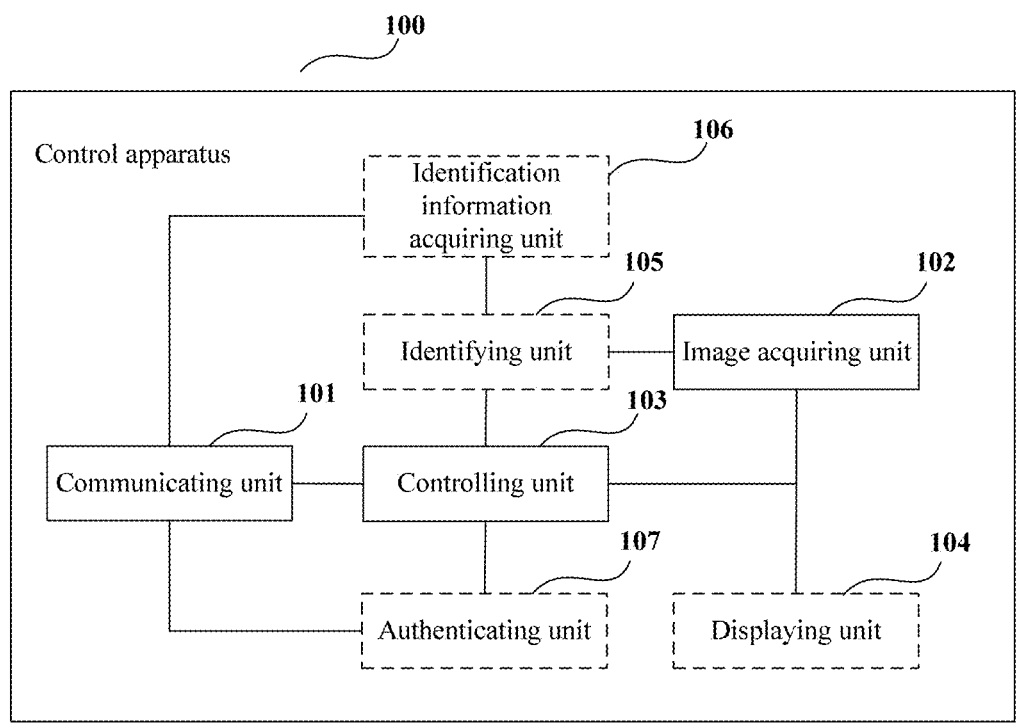
FIG. 1 is a schematic diagram of the structure of the control apparatus of 25 Embodiment 1 of the present disclosure.

An embodiment of the present disclosure provides a control apparatus. FIG. 1 is a schematic diagram of the structure of the control apparatus of Embodiment 1 of the present disclosure. As shown in FIG. 1, the control apparatus 100 includes: a communicating unit 101, an image acquiring unit 102 and a controlling unit 103.

The communicating unit 101 is configured to establish communication connection with a controlled object. The image acquiring unit 102 is configured to obtain a preview image containing the controlled object. The controlling unit 103 is configured to receive a control instruction inputted according to the preview image, and control the controlled object according to the control instruction.

It can be seen from the above embodiment that controlling the controlled object according to the preview image containing the controlled object may realize control of the controlled object in a simple and convenient manner, thereby improving user experiences.

In this embodiment, the controlled object may include all products or apparatuses needing to be controlled. For example, the controlled object may include various home appliances, digital products, family articles, vehicles, and factory equipment, such as lamps, loudspeakers, TV sets, air conditioners, curtains, automobiles, and various mechanical equipments. The type of a controlled object is not limited in embodiments of the present disclosure.

In this embodiment, the communicating unit 101 is configured to establish communication connection with the controlled object. For example, Bluetooth connection may be established by using near field communication (NFC), so as to establish the communication connection. For example, Bluetooth pairing of the control apparatus 100 and a pendant lamp is implemented via NFC contact of the control apparatus 100 and a switch of the pendant lamp, so as to establish the Bluetooth connection.

In this way, setting of Bluetooth pairing is not performed manually, and advantages of the near field communication and the Bluetooth connection are combined, thereby achieving radio communication connection conveniently and quickly.

Furthermore, the communicating unit 101 may use other manners of connection. For example, connection is performed via Bluetooth, connection is performed via WiFi. It will be understood that the manner of connection between the communicating unit and the controlled object is not limited in embodiments of the present disclosure.

In this embodiment, the image acquiring unit 102 is configured to obtain a preview image containing the controlled object; wherein, the preview image containing the controlled object refers to that the controlled object is located in a range of the preview image.

In this embodiment, the image acquiring unit includes, for example, a camera unit. The camera unit may include such elements as a lens, a viewfinder, and an image sensor, etc. A user aligns the lens of the camera unit with the controlled object, so that the controlled object is located within a preview range of the viewfinder, thereby obtaining the preview image containing the controlled object. Or the image acquiring unit may also obtain a preview image from another component having a function of image pickup. The manner of acquiring a preview image by the image acquiring unit is not limited in embodiments of the present disclosure.

In this embodiment, the image acquiring unit may also obtain a preview image from a remote camera device. For example, when a user goes out, connection with a pickup head mounted at home may be made by the communicating unit 101. The pickup head is controlled to align with a controlled object needing to be controlled, and the image acquiring unit may provide the preview image containing the controlled object. In this way, remote control of the controlled object may be implemented.

In this embodiment, the controlling unit 103 is configured to receive a control instruction inputted according to the preview image, and to control the controlled object according to the control instruction. For example, the controlling unit 103 may receive a control instruction in response to an operation of a user, and transmit the control instruction to the controlled object via the communicating unit 101.

In this embodiment, the controlling unit 103 may receive a control instruction inputted by the user according to the preview image. For example, the controlling unit 103 receives a control instruction generated in response to an operation on the controlled object by the user in the displayed preview image directly, or the controlling unit 103 receives a control instruction generated in response to an operation on a control panel by the user in the displayed preview image, or the controlling unit 103 receives a control instruction generated in response to an operation on a control interface activated according to the controlled object in the preview image.

In this embodiment, the control apparatus 100 may further include:

a displaying unit 104 configured to display in a real-time manner a change of the controlled object when the controlling unit 103 controls the controlled object according to the control instruction, or to display a picture played when the controlling unit controls the controlled object according to the control instruction.

In this embodiment, the played picture is, for example, a premade image, cartoon, or video, etc.

In this way, the user may see the change of the controlled object directly via the preview image that is displayed in a real-time manner; that is, a result of control may be seen in the preview image while the control is performed, thereby improving interest in and/or enjoyment of the control, and further improving user experiences. By playing a picture, such as an image, a cartoon, or a video, in controlling the controlled object, interest in and/or enjoyment of the control may be improved, and user experiences may also be improved. And convenience of use is improved as it is not always necessary to aim the lens at the controlled object.

In this embodiment, the displaying unit is, for example, a touch screen. However, the structure of the displaying unit is not limited in the embodiments of the present disclosure.

In this embodiment, the displaying unit 104 may further be configured to display a control panel, and the controlling unit 103 receives the control instruction inputted via the control panel.

In this embodiment, the displaying unit 104 may display a control panel corresponding to the controlled object. For example, corresponding to different types of controlled objects, different control panels may be provided.

In this way, a better control result may be obtained by providing a different control panel, e.g., a control panel corresponding to respective controlled objects.

In this embodiment, the control apparatus 100 may further include:

an identifying unit 105 configured to identify whether the controlled object is able to be controlled by the controlling unit according to preobtained identification information and the preview image; and the controlling unit 103 controls the controlled object when the controlled object is able to be controlled by the controlling unit.

In this way, by providing the identifying unit, operation of the controlling unit is started when it is identified that the controlled object is able to be controlled by the controlling unit, and the controlling unit is operable to control the controlled object in a case where it is determined that the controlled object is able to be controlled, thereby avoiding ineffective operation.

In this embodiment, the identification information may include an image and/or preset identification of the controlled object. The image may be, for example, a picture of the controlled object, and the preset identification may be, for example, a preset pattern or some words.

In this embodiment, in order to obtain the identification information, an identification information acquiring unit 106 may be provided in the control apparatus, the identification information acquiring unit 106 being configured to acquire the identification information. In this embodiment, the identification information acquiring unit 106 is optional, and is shown in dotted lines in FIG. 1.

In this embodiment, the identification information acquiring unit 106 may acquire the identification information in multiple ways. For example, after the communicating unit 101 establishes communication connection with the controlled object, the identification information acquiring unit receives the identification information of the controlled object, obtains the identification information from a network, or locally obtains the identification information.

In this embodiment, the identification information may be obtained via the controlled object. For example, before the controlled object enters into the market, the identification information may be stored in the controlled object by the manufacturer, so that the identification information acquiring unit 106 acquires the identification information from the controlled object.

In this embodiment, the identification information may be obtained via a network. For example, the manufacturer of the controlled object uploads the identification information to the network, and the user may use the identification information acquiring unit 106 to download the identification information from a server or cloud end of a corresponding network.

In this embodiment, the identification information may be directly obtained locally. For example, before the control apparatus 100 enters into the market, the manufacturer stores the identification information in the control apparatus 100, so that the identification information acquiring unit 106 directly obtains the identification information locally.

In this embodiment, when the user needs to control the controlled object, for example, the preview image containing the controlled object may be started to be obtained first, and then the identifying unit 105 is started for identification. For example, the identifying unit 105 may be started automatically after the preview image is obtained, and the identifying unit 105 may be started via a corresponding operation.

In this embodiment, the identifying unit 105 may use any existing image identifying method to identify the preview image, such as image identification based on an edge, and template matching model, etc. The method of image identification is not limited in embodiments of the present disclosure.

In this embodiment, in a case where an identification result of the identifying unit 105 is that the controlled object is able to be controlled by the control apparatus, the controlling unit 103 is operated to control the controlled object. The control apparatus 100 may further include a judging unit configured to judge whether the identification result of the identifying unit 105 is that "the controlled object is able to be controlled by the control apparatus".

In this embodiment, before operating the controlling unit 103, a selection interface may also be activated. For example, when "whether the control unit is to be started" is displayed in a screen, if the user selects "yes", operation of the controlling unit 103 is started. The control apparatus 100 may further include another judging unit configured to judge whether a selection result of the user is "start a control mode".

In this embodiment, the above two judging units may be the same component. The number of judging units and whether a judging unit is included in the control apparatus 100 are not limited in embodiments of the present disclosure.

In this embodiment, a mode of operation of the controlling unit 103 may correspond to the controlled object. That is, different modes of operation may be set according to a property and type of the controlled object and a demand of the user.

In this embodiment, for example, for a controlled object of relatively complex operation, a control panel for controlling the controlled object may be activated and displayed; and for operation of a relatively simple controlled object, a control panel may not be provided, and the user may directly operate the controlled object in the displayed preview image. If the controlled object is relatively far away or a size of the controlled object is relatively small, the preview image may be enlarged, and the controlled object is operated in the enlarged displayed preview image.

For example, the operated object is a pendant lamp, and control of the pendant lamp may generally include: turning on/off, adjusting light-emitting luminance, and adjusting light-emitting colors, etc. As the control is relatively complex, a control panel containing such items as turning on/off, a luminance adjusting bar, and a color adjusting bar, etc., may be provided, and the control panel is activated and displayed when the controlling unit is started, for the user to perform corresponding operations on the control panel, so as to control the pendant lamp.

For example, the operated object is a loudspeaker, and control of the loudspeaker may generally include: turning on/off, adjusting volume, and adjusting played items, etc. As the control is relatively complex, a control panel containing turning on/off, a volume adjusting bar, a played item control button, may be provided, and the control panel is activated and displayed when the controlling unit is started, for the user to perform corresponding operations on the control panel, so as to control the loudspeaker.

For example, the operated object is an automobile, and control of the automobile may generally include: opening/closing of doors, opening of the trunk, turning on/off of the onboard air conditioner, and adjustment of the temperature and wind speed of the onboard air conditioner. As the control is relatively complex, a control panel containing opening/closing of doors, opening of the trunk, turning on/off of the onboard air conditioner, and a temperature adjustment button and a wind speed adjustment button of the onboard air conditioner, may be provided, and the control panel is activated and displayed when the controlling unit is started, for the user to perform corresponding operations on the control panel, so as to control the automobile.

For example, the operated object is a curtain, and control of the curtain generally includes only opening and closing. A control panel may not be provided, and the user may directly operate the curtain in the displayed preview image, such as sliding a finger in the horizontal direction, so as to control the movement of the curtain.

In this embodiment, the control panel may further be updated. For example, when a function of the controlled object is changed or expanded, or a demand of the user changes, the control panel may be updated.

In this embodiment, the control apparatus 100 may further include:

an authenticating unit 107 configured to transmit an authentication request to the controlled object, and receive a message showing whether the authentication is successful from the controlled object;

and the controlling unit controls the controlled object when the authenticating unit 107 receives a message showing that the authentication is successful.

In this way, security of the control may be improved by authenticating whether the control apparatus is authorized to control the controlled object by the authenticating unit.

In this embodiment, the authenticating unit may not be provided or started in controlling common articles in public places or controlling private articles at home, and the authenticating unit is provided in controlling private articles in public places, and the private articles can only be controlled after the authentication is successful, thereby improving security of the control.

For example, when an automobile needs to be controlled in a public parking lot, the authenticating unit 107 transmits an authentication request to the automobile, and the controlling unit 103 is started to control the automobile only after the authentication is passed.

In this embodiment, authentication may be performed by using any existing method. For example, the authentication may be performed by using such methods as entering a password, and acquiring a facial image, a fingerprint, or an iris, of a user.

Figure 2:
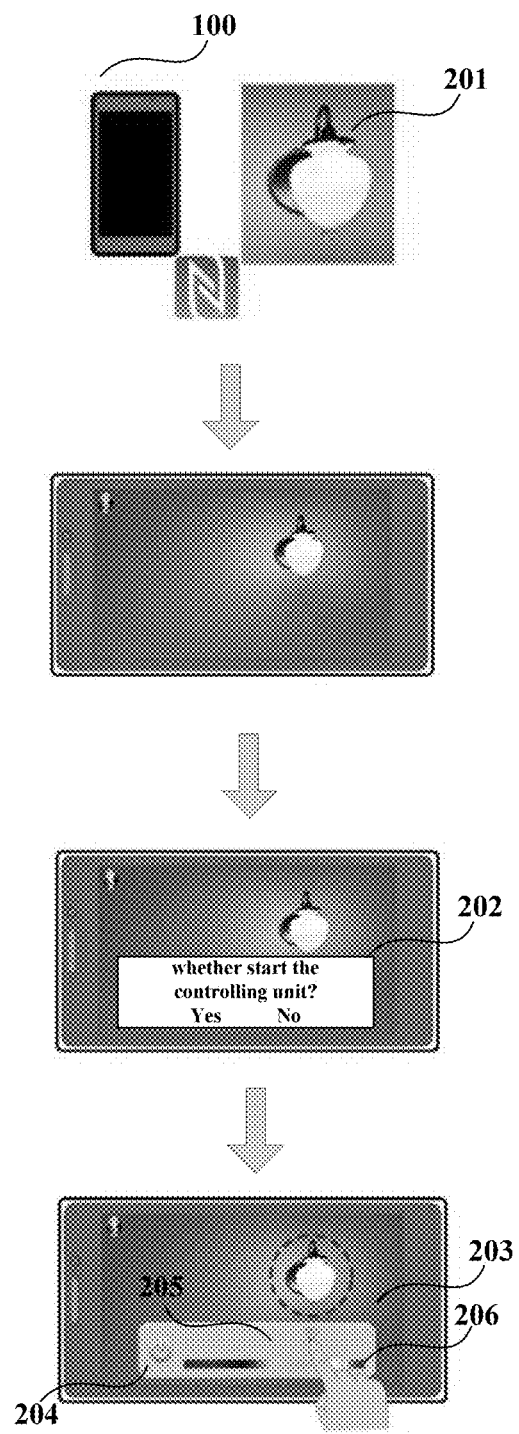
FIG. 2 is a schematic diagram of controlling a pendant lamp by using the control apparatus of Embodiment 1 of the present disclosure.

FIG. 2 is a schematic diagram of controlling a pendant lamp by using the control apparatus of this embodiment. As shown in FIG. 2, first, the control apparatus 100 establishes radio communication connection with the pendant lamp 201 via the communicating unit 101; then the image acquiring unit 102 is started to obtain a preview image containing the pendant lamp; thereafter, the identifying unit 105 identifies the preview image according to the preobtained image of the pendant lamp; finally, after it is identified that the pendant lamp is able to be controlled by the control apparatus, a selection interface 202 may be activated, that is, "whether to start the controlling unit". If the user selects "yes", a control panel 203 is activated and displayed; wherein, the control panel 203 has an on/off button 204, a luminance adjustment bar 205 and a color adjustment bar 206; and the controlling unit 103, in response to an operation of the user for luminance adjustment or on/off of the control panel 203, generates a control instruction for controlling the pendant lamp 201, and transmits the control instruction to the pendant lamp 201. During operation by the user, the preview image may display in a real-time manner a change of the pendant lamp 201 after the control instruction is received, that is, a result of the control may be seen intuitively.

Figure 3:
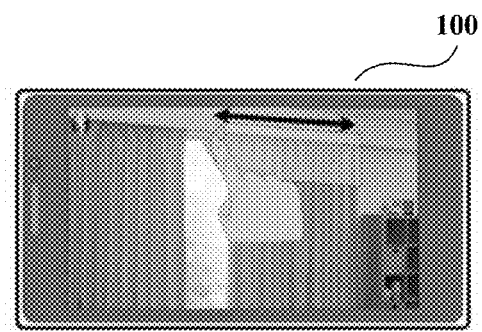
FIG. 3 is a schematic diagram of controlling a curtain by using the control apparatus of Embodiment 1 of the present disclosure.

FIG. 3 is a schematic diagram of controlling a curtain by using the control apparatus of this embodiment. After the curtain is identified, the user may control the opening and closing of the curtain by sliding a finger in the horizontal direction in the preview image that is displayed in a real-time manner.

It can be seen from the above embodiment that controlling the controlled object according to the preview image containing the controlled object may realize control of the controlled object in a simple and convenient manner, thereby improving user experiences.

Embodiment 2

Figure 4:
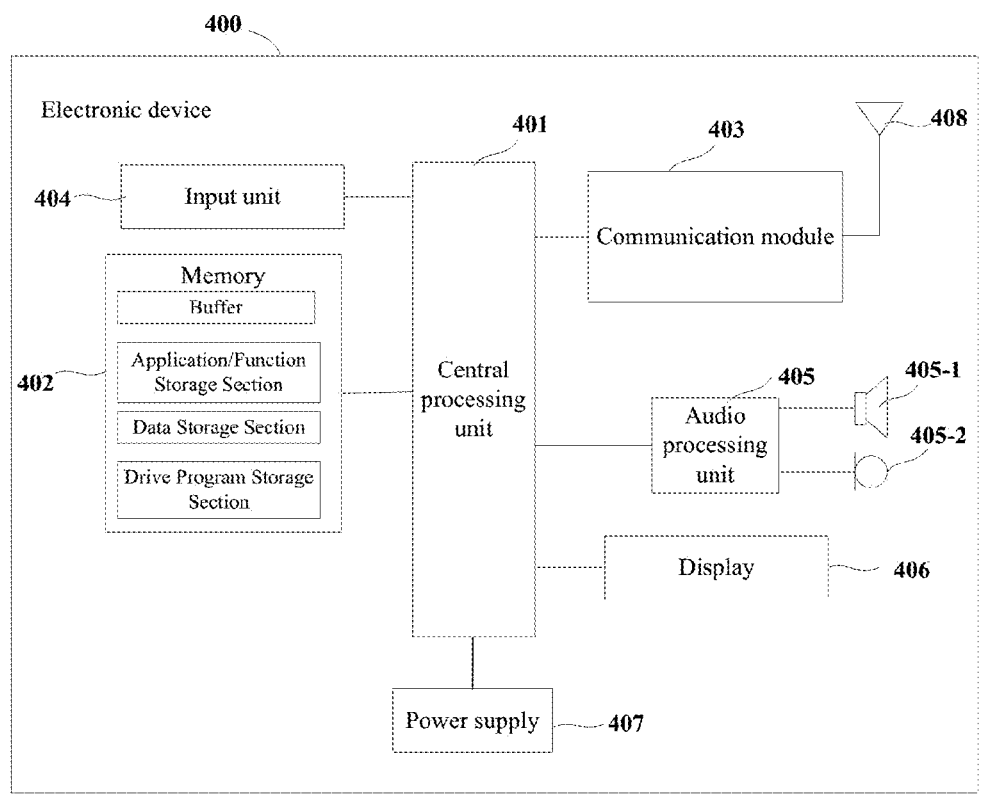
FIG. 4 is a schematic diagram of the structure of the electronic device of Embodiment 2 of the present disclosure.

An embodiment of the present disclosure provides an electronic device. FIG. 4 is a schematic diagram of the structure of the electronic device of the embodiment of the present disclosure. As shown in FIG. 4, the electronic device 400 may include a central processing unit 401 and a memory 402, the memory 402 being coupled to the central processing unit 401. It should be noted that such a figure is exemplary only, and other types of structures may be used to supplement or replace this structure for the realization of telecommunications functions or other functions.

In a mode of implementation, functions of the control apparatus may be integrated into the central processing unit 401. For example, the central processing unit 401 may be configured to: establish communication connection with a controlled object; obtain a preview image containing the controlled object; and receive a control instruction inputted according to the preview image, and control the controlled object according to the control instruction.

For example, the central processing unit 401 may further be configured to: display the preview image, and display in a real-time manner a change of the controlled object when the controlled object is controlled according to the control instruction.

For example, the central processing unit 401 may further be configured to: display a control panel of the controlled object; and the control instruction inputted according to the preview image includes: receiving the control instruction inputted via the control panel.

The central processing unit 401 may further be configured to: identify whether the controlled object is able to be controlled by the controlling unit according to preobtained identification information and the preview image; and the receiving the control instruction inputted via the control panel and controlling the controlled object according to the control instruction include: controlling the controlled object when the controlled object is able to be controlled by the controlling unit.

The central processing unit 401 may further be configured to: acquire the identification information; wherein, the acquiring the identification information includes: after the communication connection with the controlled object is established, receiving the identification information of the controlled object, obtaining the identification information from a network, or locally obtaining the identification information.

The identification information includes: an image and/or preset identification of the controlled object.

The central processing unit 401 may further be configured to: transmit an authentication request to the controlled object, and receive a message showing whether the authentication from the controlled object is successful; and the receiving the control instruction inputted via the control panel and controlling the controlled object according to the control instruction include: controlling the controlled object when the a message showing that the authentication is successful is received The communication connection is established in the following manner: using near-field communication to establish Bluetooth connection, connecting directly via Bluetooth, or connecting via WiFi.

In another mode of implementation, the control apparatus and the central processing unit 401 may be configured separately. For example, the control apparatus may be configured as a chip connected to the central processing unit 401, with the functions of the control apparatus being realized under control of the central processing unit.

As shown in FIG. 4, the electronic device 400 may further include a communication module 403, an input unit 404, an audio processing unit 405, a loudspeaker 405-1, a microphone 405-2, a display 406, and a power supply 407, and an antenna 408. It should be noted that the electronic device 400 does not necessarily include all the parts shown in FIG. 4; furthermore, the electronic device 400 may include other parts not shown in FIG. 4, and the prior art may be referred to for these parts.

As shown in FIG. 4, the central processing unit 401 is sometimes referred to as a controller or control, and may include a microprocessor or other processor devices and/or logic devices. The central processing unit 401 receives input and controls operations of every components of the electronic device 400.

The memory 402 may be, for example, one or more of a buffer memory, a flash memory, a hard drive, a mobile medium, a volatile memory, a nonvolatile memory, or other suitable devices. And the central processing unit 401 may execute the program stored in the memory 402, so as to realize information storage or processing, etc. Functions of other parts are similar to those of the prior art, which shall not be described herein any further. The parts of the electronic device 400 may be realized by specific hardware, firmware, software, or any combination thereof, without departing from the scope of the present disclosure.

It can be seen from the above embodiment that controlling the controlled object according to the preview image containing the controlled object may realize control of the controlled object in a simple and convenient manner, thereby improving user experiences.

Embodiment 3

An embodiment of the present disclosure provides a control method. As a principle of the method for solving problems is similar to those of the function of the components of the control apparatus of Embodiment 1, the implementation of the control apparatus of Embodiment 1 may be referred to for the implementation of the method, and identical parts shall not be described herein any further.

Figure 5:
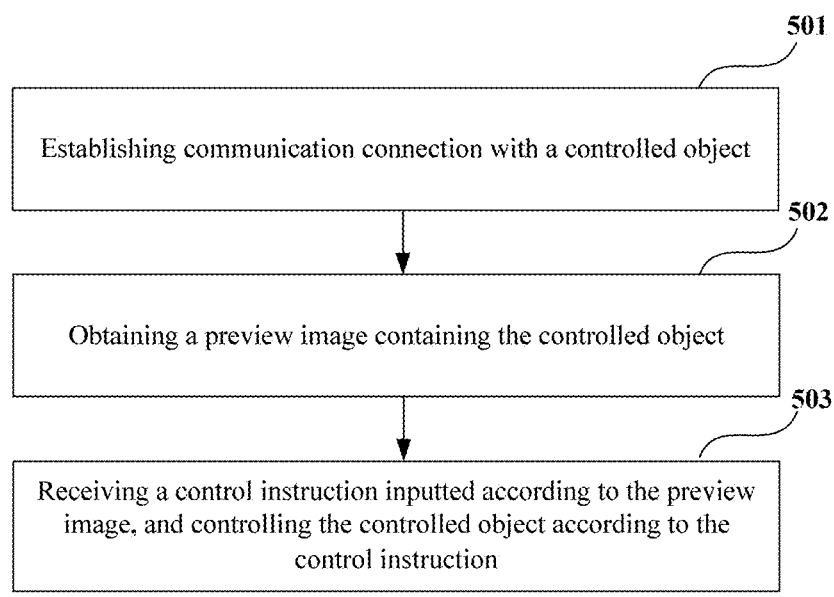
FIG. 5 is a flowchart of the control method of Embodiment 3 of the present disclosure.

FIG. 5 is a flowchart of the control method of this embodiment. As shown in FIG. 5, the method includes:

step 501: establishing communication connection with a controlled object;

step 502: obtaining a preview image containing the controlled object; and step 503: receiving a control instruction inputted according to the preview image, and controlling the controlled object according to the control instruction.

The method of establishing communication connection with a controlled object, the method of obtaining a preview image containing the controlled object, and the method of receiving a control instruction inputted according to the preview image, and controlling the controlled object according to the control instruction, of this embodiment, are identical to what are described in Embodiment 1, which shall not be described herein any further.

It can be seen from the above embodiment that controlling the controlled object according to the preview image containing the controlled object may realize control of the controlled object in a simple and convenient manner, thereby improving user experiences.

Embodiment 4

Figure 6:
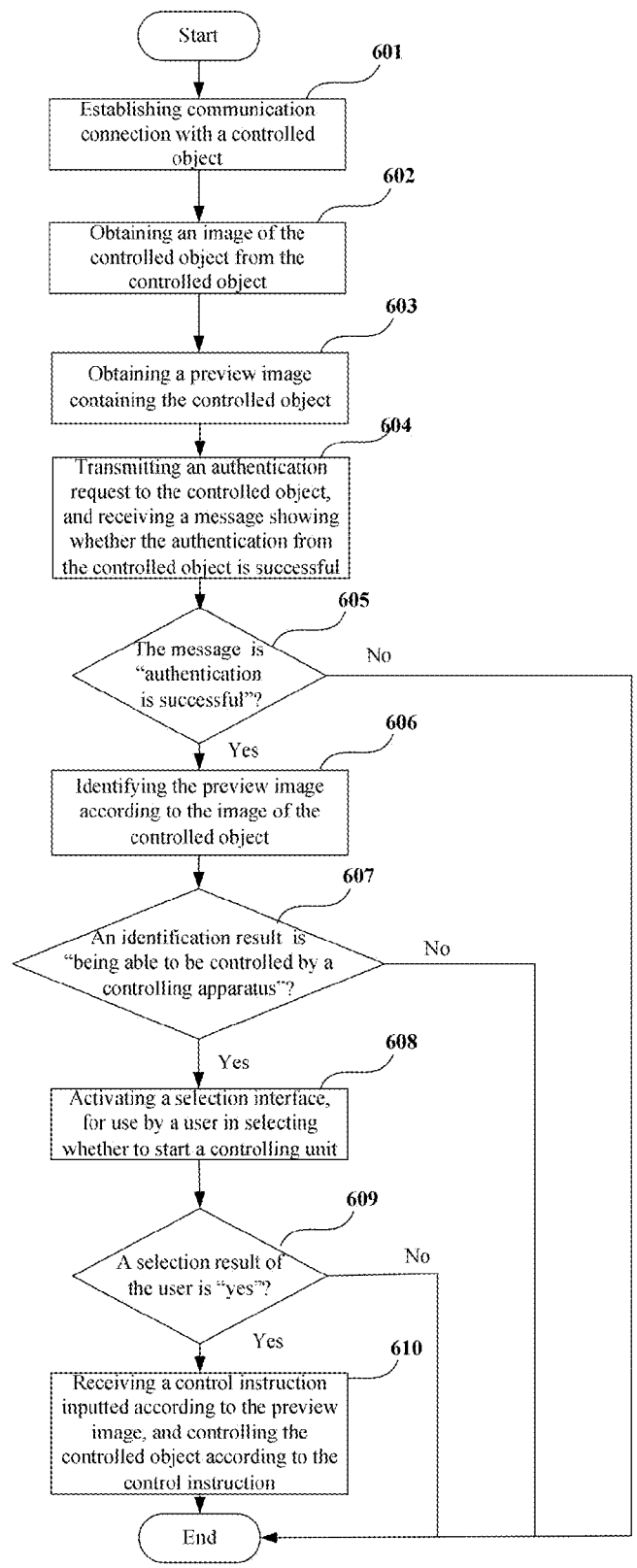
FIG. 6 is a flowchart of the control method of Embodiment 4 of the present disclosure.

FIG. 6 is a flowchart of the control method of this embodiment, which describes an application example of the control method of Embodiment 3.

As shown in FIG. 6, the method includes: step 601: establishing communication connection with a controlled object; step 602: obtaining an image of the controlled object from the controlled object; step 603: obtaining a preview image containing the controlled object;

step 604: transmitting an authentication request to the controlled object, and receiving a message showing whether the authentication from the controlled object is successful;

step 605: judging whether the message is "authentication is successful", and entering into step 606 if it is judged "yes", otherwise, terminating the process;

step 606: identifying the preview image according to the image of the controlled object; step 607: judging whether an identification result is "being able to be controlled by a controlling apparatus", entering into step 606 if it is judged "yes", and terminating the process if it is judged "no";

step 608: activating a selection interface, for use by a user in selecting whether to start a controlling unit; step 609: judging whether a selection result of the user is "yes", entering into step 608 if a judgment result is "yes", and terminating the process if the judgment result is "no"; and step 610: receiving a control instruction inputted according to the preview image, and controlling the controlled object according to the control instruction.

The method of establishing communication connection with a controlled object, the method of obtaining an image of the controlled object from the controlled object, the method of obtaining a preview image, the method of identifying the preview image according to the image of the controlled object, and the method of receiving a control instruction inputted according to the preview image, and controlling the controlled object according to the control instruction, of this embodiment, are identical to what are described in Embodiment 1, which shall not be described herein any further.

It can be seen from the above embodiment that controlling the controlled object according to the preview image containing the controlled object may realize control of the controlled object in a simple and convenient manner, thereby improving user experiences.

An embodiment of the present disclosure further provides a computer-readable program, wherein when the program is executed in a control apparatus or an electronic device, the program enables the computer to carry out the control method as described in Embodiment 3 or Embodiment 4 in the control apparatus or the electronic device.

An embodiment of the present disclosure further provides a storage medium in which a computer-readable program is stored, wherein the computer-readable program enables the computer to carry out the control method as described in Embodiment 3 or Embodiment 4 in a control apparatus or an electronic device.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above.

The present disclosure also relates to a storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the spirits and principle of the present disclosure, and such variants and modifications fall within the scope of the present disclosure.

The invention claimed is:

1. An electronic device, comprising:
    a communicating circuitry configured to establish communication connection with a controllable object;
    an image acquiring circuitry configured to obtain from the controllable object a preview image containing the controllable object; and
    a controlling circuitry configured to receive a control instruction based on the preview image to control the controllable object according to the control instruction.

2. The electronic device according to claim 1, wherein the electronic device further comprises:
    a displaying circuitry configured to display in a real-time manner a change of the controllable object when the controlling circuitry controls the controllable object according to the control instruction, or to display a picture played when the controlling circuitry controls the controllable object according to the control instruction.

3. The electronic device according to claim 2, wherein the displaying circuitry is further configured to display a control panel, and the controlling circuitry receives the control instruction inputted via the control panel.

4. The electronic device according to claim 3, wherein the displaying circuitry displays a control panel corresponding to the controllable object.

5. The electronic device according to claim 1, wherein the electronic device further comprises:
    an authenticating circuitry configured to transmit an authentication request to the controllable object, and receive a message showing whether the authentication from the controllable object is successful; and
    the controlling circuitry controls the controllable object when the authenticating circuitry receives a message showing that the authentication is successful.

6. The electronic device according to claim 1, wherein the communicating circuitry establishes the communication connection via at least one of using near-field communication to establish Bluetooth connection, connecting directly via Bluetooth, or connecting via WiFi.

7. The electronic device according to claim 1, wherein the electronic device is one of a mobile phone, tablet computer, smart glasses, camera or a wearable device.

8. The electronic device according to claim 1, wherein the electronic device further comprises:
    an identifying circuitry configured to identify whether the controllable object is able to be controlled by the controlling circuitry according to identification information and the preview image; and
    the controlling circuitry controls the controllable object when the controllable object is able to be controlled by the controlling circuitry.

9. An electronic device comprising:
    a communicating circuitry configured to establish communication connection with a controllable object;
    an image acquiring circuitry configured to obtain a preview image containing the controllable object;
    an authentication circuitry configured to transmit an authentication request to the controllable object and configured to receive an authentication message;
    a controlling circuitry configured to receive a control instruction inputted according to the preview image, and to control the controllable object according to the control instruction after receiving an authentication message.

10. The electronic device according to claim 9, wherein a displaying circuitry is configured to indicate successful authentication in response to receiving the authentication message.

11. The electronic device according to claim 10, wherein the authentication request includes one of a password, a facial image, a fingerprint, an iris image.

12. A control method, comprising:
    establishing communication connection with a controllable object;
    acquiring via an image acquiring circuitry a preview image; and
    receiving a control instruction based on the preview image to control the controllable object according to the control instruction.

13. The method according to claim 12, wherein the method further comprises:
    displaying in a real-time manner a change of the controllable object when controlling the controllable object according to the control instruction, or displaying a picture played when controlling the controllable object according to the control instruction.

14. The method according to claim 13, wherein the method further comprises:
    displaying a control panel; and the receiving a control instruction based on the preview image comprises: receiving the control instruction inputted via the control panel.

15. The method according to claim 14, wherein the displaying a control panel comprises: displaying a control panel corresponding to the controllable object.

16. The method according to claim 12, wherein the method further comprises:

identifying whether the controllable object is able to be controlled by the controlling circuitry according to identification information and the preview image; and the receiving a control instruction based on the preview image, and controlling the controllable object according to the control instruction comprises: controlling the controllable object when the controllable object is able to be controlled by the controlling circuitry.

17. The method according to claim 16, wherein the method further comprises:

acquiring the identification information; wherein, the acquiring the identification information comprises: after the communication connection with the controllable object is established, receiving the identification information of the controllable object, obtaining the identification information from a network, or locally obtaining the identification information.

18. The method according to claim 17, wherein the identification information comprises: at least one of an image or preset identification of the controllable object.

19. The method according to claim 12, wherein the method further comprises:

transmitting an authentication request to the controllable object, and receiving a message showing whether the authentication from the controllable object is successful; and the receiving a control instruction based on the preview image, and controlling the controllable object according to the control instruction comprises: controlling the controllable object after a message showing that the authentication is successful is received.

20. The method according to claim 12, wherein the communication connection is established via at least one of using near-field communication to establish Bluetooth connection, connecting directly via Bluetooth, or connecting via WiFi.

* * * * *